US012717741B2

(12) United States Patent
Aburajab Tamimi et al.

(10) Patent No.: US 12,717,741 B2
(45) Date of Patent: Aug. 25, 2026

(54) FLEXIBLE DEVICE INTERFACE GENERATION

(71) Applicant: Arista Networks, Inc., Santa Clara, CA (US)

(72) Inventors: Zeyad Essam R Aburajab Tamimi, Vancouver (CA); Paul Martin Fallon, Mountain View, CA (US); Ravil Baizhiyenov, Burnaby (CA); John Peach, Maidenhead (GB)

(73) Assignee: Arista Networks, Inc., Santa Clara, CA (US)

( * ) Notice: Subject to any disclaimer, the term of this patent is extended or adjusted under 35 U.S.C. 154(b) by 278 days.

(21) Appl. No.: 18/361,604

(22) Filed: Jul. 28, 2023

(65) Prior Publication Data

US 2024/0273044 A1 Aug. 15, 2024

Related U.S. Application Data

(60) Provisional application No. 63/484,929, filed on Feb. 14, 2023.

(51) Int. Cl.
*G06F 13/14* (2006.01)
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS 9,172,602 B1 * 10/2015 Dropps ............... H04L 49/3054
2017/0308325 A1 * 10/2017 Pearson ................ G06F 3/0659
2020/0349103 A1 * 11/2020 Luong ................ G06F 13/4081
2022/0050800 A1 * 2/2022 Kim .................... G06F 13/4022

* cited by examiner

*Primary Examiner* — Henry Tsai
*Assistant Examiner* — Dean Phan
(74) *Attorney, Agent, or Firm* — Treyz Law Group, P.C.; Tianyi He

(57) ABSTRACT

A network device may include a number of ports each having one or more physical lanes. These physical lanes of the port may be used to implement interfaces through which the network device can communicate internally and/or with external equipment. Control circuitry on the network device may flexibly generate the interfaces to be identifiable in a manner independent of the physical lanes on which they are implemented. The control circuitry may use port profiles and/or module profile to generate the interfaces, if desired, and/or may receive user input usable to generate the interfaces.

20 Claims, 13 Drawing Sheets

| MAPPING OF INTERFACE TO LANE | |
|---|---|
| INTERFACE (IDENTIFIER)<br><Module Identifier>/<br><Port Identifier>/<br><Lane Identifier> | PHYSICAL (PORT) LANE |
| 1/1/1 | 1 |
| 1/1/2 | 2 |
| 1/1/3 | 3 |
| 1/1/4 | 4 |
| 1/1/5 | 5 |
| 1/1/6 | 6 |
| 1/1/7 | 7 |
| 1/1/8 | 8 |

36 38

| INTERFACE (IDENTIFIER) | INTERFACE SPEED | PHYSICAL LANE | LANE SPEED |
|---|---|---|---|
| 1/1/1 | 4X | 1 | X |
| | | 2 | X |
| | | 3 | X |
| | | 4 | X |
| 1/1/5 (1/1/2 - MORE DESIRABLE) | 4X | 5 | X |
| | | 6 | X |
| | | 7 | X |
| | | 8 | X |

42 48 44 46

FLEXIBLE DEVICE INTERFACE GENERATION

This application claims the benefit of U.S. provisional patent application No. 63/484,929, filed Feb. 14, 2023, which is hereby incorporated by reference herein in its entirety.

BACKGROUND

This relates to network devices, and more particular, to interfaces of network devices.

Network device interfaces are implemented over underlying physical connector structures such as the physical lanes of ports. While the underlying physical connector structures typically remain fixed, the network device interfaces can be configured and re-configured to suit the needs of the networking system.

DETAILED DESCRIPTION

A network device can include physical structures on which functional interfaces are implemented. In particular, a network device can include one or more physical ports each having a number of conductive connector lanes (sometimes referred to as physical lanes or port lanes). If desired, a network device can include a number of physical modules each containing a set of physical ports, each of which has a number of conductive connector lanes. Functional interfaces (sometimes referred to as virtual interfaces) for the network device can be formed from these physical port lanes. Because the configuration of these physical structures seldom change (e.g., physical ports and their lanes are manufactured to a given specification), the naming convention and corresponding lane identifiers of these physical lanes are similarly fixed. Functional interfaces can derive their corresponding interface identifiers at least in part based on the lane identifiers of the lanes on which the interfaces are implemented.

However, unlike physical lanes or other physical structures that are fixed in nature, functional interfaces can be generated (e.g., configured) and updated (e.g., re-configured) throughout the lifecycle of the network device depending on the functional needs of the network device, network administrator, and network. Therefore, inherently tying the identifiers of functional interfaces, which can be flexible or changeable in nature, to the identifiers of the physical lanes, which are inflexible or fixed in nature, may be undesirable and inefficient.

Accordingly, it may be desirable to provide one or more mechanisms through which the naming convention, and consequently the interface identifiers, of functional interfaces can be customized (e.g., based on user input) in a manner independent of the naming convention and identifiers of the physical lanes and/or other physical structures of the network device. If desired, port profile(s) and/or module profile(s) may be provided to assign the flexible and customized interface identifiers. An illustrative network device at which functional interfaces may be flexibly generated (e.g., to have customized interface identifiers) is shown in FIG. 1.

Figure 1:
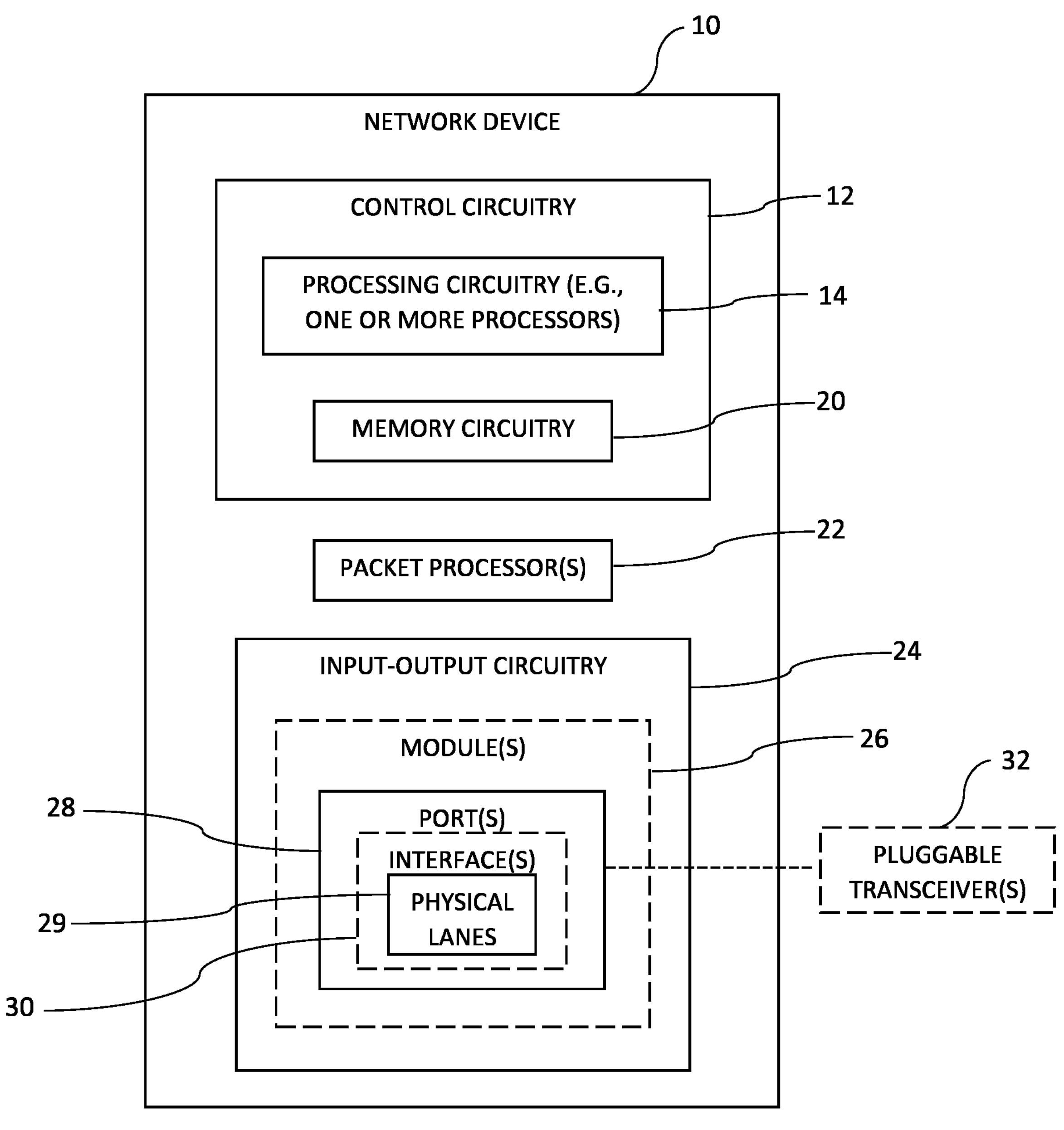
FIG. 1 is a diagram of an illustrative network device having physical structures such as physical ports each forming one or more interfaces in accordance with some embodiments.

FIG. 1 is a block diagram of an illustrative network device 10 that may be part of an illustrative network containing multiple instances of network device 10 (e.g., with varying configurations). Each network device 10 may be a switch (e.g., a multi-layer OSI Layer 2 and OSI Layer 3 (L2/L3) switch), a router or gateway, a bridge, a hub, a repeater, a firewall, a wireless access point, a device serving other networking functions, a device that includes a combination of these functions, or other types of network devices. Multiple such network devices 10 (e.g., of different types or having different functions) may be present in the network and interconnected therebetween and with other network devices in other network portions to form a communications network that forwards traffic (e.g., in the form of frames, packets, and/or other datagrams) between end hosts.

Network device 10 may include control circuitry 12 having processing circuitry 14 and memory circuitry 20, one or more packet processors 22, and input-output circuitry 24 (sometimes referred to as interface circuitry 24 or network interface circuitry 24) disposed within a housing of network device 10 and/or mounted to a substrate (e.g., a printed circuit board) of network device 10. In one illustrative arrangement, network device 10 may be or form part of a modular network device system (e.g., a modular switch system having removably coupled line card modules usable to flexibly expand the capabilities such as ports, specialized functionalities, etc., of the modular switch system). In other words, network device 10 may include a chassis on which one or more line cards and/or other removable modules are mounted, may be a line card module itself, or may form other parts of the modular switch system. In another illustrative arrangement, network device 10 may be a fixed-configuration network device (e.g., a fixed-configuration switch having a fixed number of ports and/or a fixed hardware architecture).

Processing circuitry 14 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 14 may run (e.g., execute) a network device operating system and/or other software/firmware that is stored on memory circuitry 20. Memory circuitry 20 may include one or more non-transitory (tangible) computer-readable storage media that stores the operating system software and/or any other software code, sometimes referred to as program instructions, software, data, instructions, or code. As an example, network device control plane functions may be stored as (software) instructions on the non-transitory computer-readable storage media (e.g., in portion(s) of memory circuitry 20 in network device 10). The corresponding processing circuitry (e.g., one or more processors of processing circuitry 14 in network device 10) may process or execute the respective instructions to perform the corresponding operations. Memory circuitry 20 may be implemented using non-volatile memory (e.g., flash memory or other electrically-programmable read-only memory configured to form a solid-state drive), volatile memory (e.g., static or dynamic random-access memory), hard disk drive storage, and/or other storage circuitry. Processing circuitry 14 and memory circuitry 20 as described above may sometimes be referred to collectively as control circuitry 12 (e.g., implementing a control plane of network device 10).

In particular, processing circuitry 14 may execute network device control plane software such as operating system software, routing policy management software, routing protocol agents or processes, routing information base agents, and other control software, may be used to support the operation of protocol clients and/or servers (e.g., to form some or all of a communications protocol stack), may be used to support the operation of packet processor(s) 22, may store packet forwarding information, may execute packet processing software, and/or may execute other software instructions that control the functions of network device 10 and the other components therein.

Packet processor(s) 22 may be used to implement a data plane or forwarding plane of network device 10. Packet processor(s) 22 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures. If desired, one or more packet processors 22 may be implemented on removable modules such as line cards (e.g., removably coupled to a modular network device system containing device 10).

Packet processor 22 may receive incoming data packets via input-output circuitry 24, parse and analyze the received data packets, process the packets based on packet forwarding decision data (e.g., in a forwarding information base) and/or in accordance with network protocol(s) or other forwarding policy, and forward (or drop) the data packet accordingly. The packet forwarding decision data may be stored on a portion of memory circuitry 20 and/or other memory circuitry integrated as part of or separate from packet processor 22.

Input-output circuitry 24 may include any suitable type communication interface components or modules 26. Each of these communication interface modules 26 may implement one or more Ethernet interfaces, one or more optical interfaces, one or more Bluetooth interfaces, one or more Wi-Fi interfaces, and/or other networking interfaces for connecting network device 10 to the Internet, a local area network, a wide area network, a mobile network, other portions of the communications network, and/or to other network device(s), peripheral devices, and/or other computing equipment (e.g., host equipment, user equipment, etc.). If desired, some of these types of interfaces may serve dedicated functions (e.g., may be management interfaces, may be exclusively uplink interfaces, may be exclusively downlink interfaces, etc.).

Configurations in which one or more modules 26 are physical layer (L1) interface modules are described herein as illustrative examples. Physical layer interface modules may be implemented on line cards, may be implemented on other types of hardware cards with ports, and/or may include an arbitrary grouping of ports. In these configurations, each module 26 may include one or more ports 28. These ports 28 are physical slots or sockets (sometimes referred to as cages) through which other components can be physically and electrically coupled to device 10 (e.g., via mating connections to the corresponding ports 28). Ports 28 may have different form-factors to accommodate mating with different cables, different modules, different devices, or generally different external equipment. Each module 26 may also include peripheral circuitry that supports the operation of ports 28 when implementing various interfaces for communication.

Configurations in which one or more ports 28 are configured to receive pluggable transceiver modules such as corresponding pluggable transceiver module(s) 32 are sometimes described herein as an illustrative example. Each transceiver module 32 may be inserted or plugged into one or more ports 28. As examples, the types of transceiver module(s) 32 (receivable by ports 28) may include any combination of small form-factor pluggable (SFP) modules, quad small form-factor pluggable (QSFP) modules, QSFP double density module (QSFP-DD) modules, octal small form-factor pluggable (OSFP) modules, and other pluggable (e.g., removable) transceiver modules. If desired, one or more other ports 28 may be configured to receive other types of extension or expansion modules such as other network interface modules, removable network modules that expands the functionalities of network device 10 (e.g., an asynchronous transfer mode network module, an Ethernet network module, a router or virtual private network module, a network services module, a route processor module, etc.), and any other suitable modules. An optical or electrical transceiver module 32, when plugged into or received in port(s) 28, may enable network device 10 to be coupled to another network device 10 through a (high-speed) fiber-optic or a copper cable.

Ports 28 and/or modules 26 may include external ports such as management ports and Ethernet ports that are exposed to an exterior of device 10 (e.g., for use by a user to connect device 10 to external equipment) and may include internal ports such as fabric ports that receive internal components of device 10 and/or connect internal components of device 10 to one another (e.g., that connect one packet processor 22 to another packet processor 22, that connect a portion of a packet processor 22 to another portion of the same packet processor 22, that connect a packet processor 22 to processing circuitry 14 and/or memory circuitry 20, etc.). Additionally, ports 28 may include RJ45 connector ports, on-board and co-packaged optical modules, and/or other types of ports that do not necessarily receive external modules (e.g., an external transceiver module) to facilitate the port connection. In general, the embodiments described herein with respect to flexible interface generation (e.g., the use of desired interface identifiers to generate interfaces) may be applicable to any of these types of ports 28.

To help facilitate the above-mentioned types of connections, each port 28 may include a plurality of physical lanes 29 (sometimes referred to herein as physical port lanes, port lanes, or signaling lanes). Physical lanes 29 may be formed from electrical channels (e.g., electrically conductive traces or patterns) and/or optical channels within the connector portion of each port 28. The signals may be conveyed through these channels. These physical lanes 29 for each port 28 may be used separately or in any combination to provide one or more (e.g., Ethernet) interfaces 30 for that port 28. As described herein, providing or generating interface(s) 30 may include defining a name for the interface, and associating or linking a set of interface configurations such as interface speed (e.g., as received from a user or another source) to the underlying physical hardware applied with the interface configurations. Each of these interfaces 30 may be associated with and therefore identifiable via one or more physical lanes 29 (e.g., at any given time). Whereas each physical lane 29 can be physically configured to transfer data at a physical lane data transfer rate (sometimes referred to herein as a lane speed), each interface 30 may be generated (e.g., over one or more physical lanes 29) to transfer data at an interface data transfer rate (sometimes referred to herein as an interface speed).

Control circuitry 12 (e.g., processing circuitry 14) may generate these Ethernet interfaces by defining the corresponding characteristics of each interface 30 (e.g., by naming a particular interface, by specifying an interface type of the particular interface such as Ethernet, by specifying an interface speed of the particular interface, etc.) based on the physical lanes 29 of port 28. Configurations in which port(s) 28 implement Ethernet interfaces are sometimes described herein as an illustrative example.

Figure 2:
FIG. 2 is a table of an illustrative mapping of interfaces to physical port lanes in accordance with some embodiments.

FIG. 2 is a table 34 of an illustrative default mapping between interfaces 30 (FIG. 1) and the corresponding physical lanes 29 of a port 28 (FIG. 1) from which the interfaces are implemented. As shown in FIG. 2, each interface 30 in column 36 may be identifiable by or named by a module identifier (e.g., identifying a particular module 26 in FIG. 1), a port identifier (e.g., identifying a particular port 28 on the particular module 26), and a lane identifier (e.g., identifying the leading physical lane for the interface). The lane identifier of each interface 30 may correspond to a respective physical lane identified in column 38. The leading physical lane may be the preferred physical lane in a group of physical lanes (e.g., by convention, the port lane with the smallest lane identifier, or if desired, the port lane with the largest lane identifier, or generally the port lane preferred based on another metric), or as in the example of FIG. 2, the single underlying physical lane when a single physical lane is used to implement the interface. If desired, the lane identifier (sometimes referred to as the lane designator) and/or the module identifier (sometimes referred to as the module designator) may be omitted (e.g., in fixed-configuration network devices or other implementations of network device 10 containing only a single module 26). If desired, a network device specific designator (or identifier) may also be specified. In other words, an interface identifier can include a device-specific identifier, a module identifier, a port identifier, and/or a lane identifier.

In the example of FIG. 2, the module 26 having a module identifier of 1 contains at least the port 28 having a port identifier of 1 (or 1/1 if including both the module identifier of 1 and the port identifier of 1). This port 28 may include eight physical lanes 1-8 which can be configured to form eight different interfaces 1/1/1, 1/1/2, 1/1/3, 1/1/4, 1/1/5, 1/1/6, 1/1/7, and 1/1/8. Each of these eight interfaces are formed from and identified by a corresponding physical port lane on which the respective interface is implemented. Put more explicitly, interface . . . /1 (referring to interface 1/1/1) is implemented on and therefore identifiable by physical lane 1, interface . . . /2 (referring to interface 1/1/2) implemented on and therefore identifiable by physical lane 2, interface . . . /3 (referring to interface 1/1/3) implemented on and therefore identifiable by physical lane 3, etc.

While processing circuitry 14 can default to identifying these eight interfaces for configuration by this convention (e.g., the identification convention based on the physical lane numbering), this convention can become impractical when applied to other interface configurations (e.g., interface configurations in which there is a one-to-many mapping of interface-to-lane) and/or can become undesirable based on user needs. In particular, in some illustrative applications, an administrator may desire that an interface be identifiable by a lane identifier not corresponding to the physical lane on which the interface is implemented (e.g., an interface implemented on physical lane 4 may desirably be identified by 1/1/8 or 1/1/10).

Figure 3:
FIG. 3 is a table of an illustrative mapping of interfaces to physical port lanes in a breakout configuration in accordance with some embodiments.

FIG. 3 is a table 40 of an illustrative interface configuration for port 28 (e.g., the same port 28 described in connection with FIG. 2) implementing two interfaces identified in column 42 with a one-to-four mapping of interface-to-lane. In other words, interface 1/1/1 is implemented over and therefore consumes the resources of physical lanes 1-4 identified in column 44, while interface 1/1/5 is implemented over and therefore consumes the resources of physical lanes 5-8 identified in column 44. Whereas each physical lane has a lane speed of X as indicated in column 46, the two interfaces may have an interface speed of four times X (i.e., 4×) as indicated in column 48. As examples, lane speed X may be 10 Gbps, 25 Gbps, 50 Gbps, 100 Gbps, or generally greater than 1 Gbps.

While in consideration of the convention described in connection with FIG. 2, the use of interface identifier 1/1/5 to identify the interface implemented using physical lanes 5-8 may appear reasonable (as it uses the numbering of one of the consumed physical lanes, namely physical lane 5, for identification), this association may not be apparent to a user (e.g., a network administrator or operator configuring interfaces for device 10) because the physical lanes and their numbering scheme are largely incidental from the user's point of view. Without consideration for the physical lanes and their numbering scheme, it may be more desirable to identify the second interface (e.g., implemented by physical lanes 5-8) using interface (name or identifier) 1/1/2 as indicated in column 42. Accordingly, the combination of interfaces . . . /1 and . . . /2 may be more logically interpretable (e.g., by a user) as two interfaces of port 28 (e.g., compared to the use of interfaces . . . /1 and . . . /5). However, interface "1/1/2" already has a default mapping to physical lane 2 (e.g., as described in connection with FIG. 2). As such, directly referring to interface "1/1/2" to identify the interface implemented over physical lanes 5-8 may not be possible as referring to interface "1/1/2" may be interpreted as referring to the default "interface" of physical lane 2 which is already consumed in the example of FIG. 3.

Figure 4A:
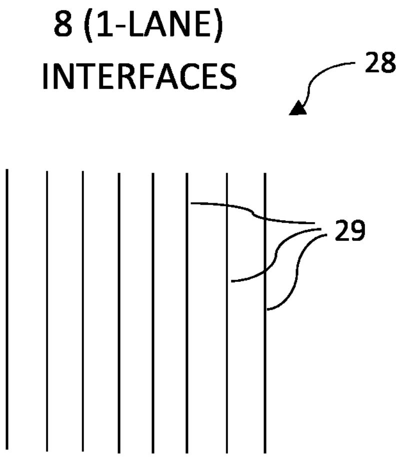
FIGS. 4A-4D are diagrams of some illustrative interface configurations for the same physical port in accordance with some embodiments.
Figure 4B:
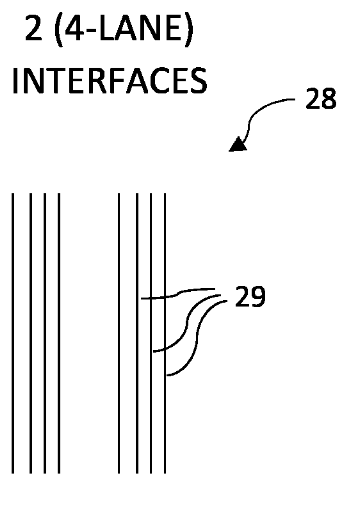
Figure 4C:
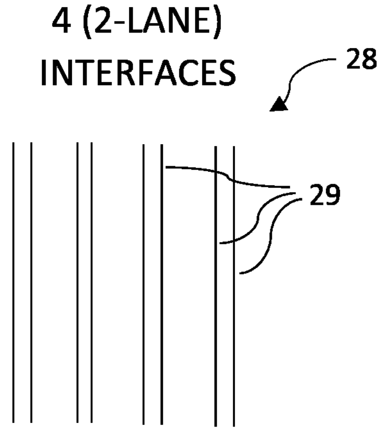

Furthermore, the interface configuration shown in FIG. 3 is only one of many possible interface configurations for port 28 (e.g., the same port 28 described in connection with FIGS. 2 and 3). FIGS. 4A-4D show illustrative physical lane groupings (sometimes referred to herein as different breakout configurations) for the same port 28 configured to implement different interface configurations. FIG. 4A shows a first breakout configuration of the same port 28 with eight lanes 29 of port 28 forming eight one-lane (1L) interfaces (e.g., similar to the configuration described in connection with FIG. 2). FIG. 4B shows a second breakout configuration of the same port 28 with eight lanes 29 of port 28 forming two four-lane (4L) interfaces (e.g., similar to the configuration described in connection with FIG. 3). FIG. 4C shows a third breakout configuration of the same port 28 with eight lanes 29 of port 28 forming four two-lane (2L) interfaces.

While FIGS. 4A-4C illustrate different static grouping of lanes to form interfaces, this is merely illustrative. If desired, in some illustrative configurations, one or more interfaces can be forced into an inactive state to enable one or more other interfaces to consume additional lanes. Using FIG. 4C as an example, three of the four two-lane interfaces may be placed in an inactive state to enable the remaining active interface to consume all eight lanes. In other words, mapping of an interface to a leading lane (e.g., lane 1) may allow consumption of subsequent lanes (e.g., lanes 2-8) when a multi-lane speed is desired and configured.

Figure 4D:
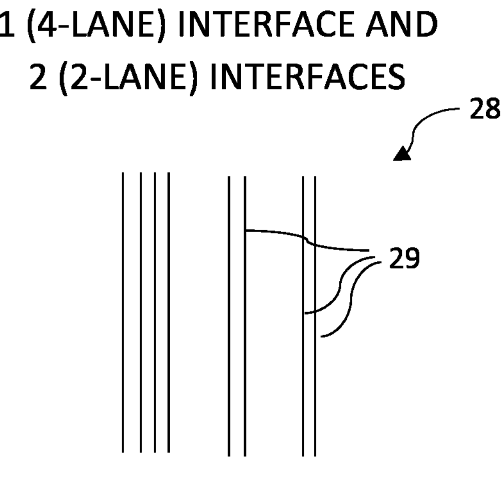

Configurations in which interfaces of a port are all formed by the same number of lanes are merely illustrative. FIG. 4D shows a fourth breakout configuration of the same port 28 with eight lanes 29 of port 28 forming one four-lane (1L) interface and two two-lane (2L) interfaces.

Analogous issues of referencing interface(s) by a particular (desired) interface identifier exist across different interface configurations (e.g., in connection with the interface configuration of FIGS. 4C and 4D in addition to the interface configuration of FIG. 4B described in connection with FIG. 3). In particular, the (default) interface identifier for any interface configuration (e.g., even for the one-to-one interface to lane mapping configuration of FIGS. 2 and 4A) is inflexibly assigned and associated with the physical lane identifier of the (leading) lane on which the interface is implemented. This type of default interface identifier may not meet the needs of the user (e.g., network administrator), the needs of the network device context, and/or other needs of the networking system.

In some instances, these issues of inflexible interface identifiers can further be amplified in device configurations (e.g., of network device 10) containing multiple ports (e.g., each with varying interface configurations) and multiple modules (e.g., each containing ports each with varying interface configurations), and especially in network configurations containing multiple network devices 10 (e.g., each with varying interface configurations). In other words, in some instances, each of these varying interfaces configurations for different ports, for different modules, and/or for different devices may not only desire flexible interface identifiers but also desire sets of flexible interface identifiers with different naming conventions (e.g., one interface configuration may use the naming convention of FIG. 2, one interface configuration may use the less desired naming convention of FIG. 3, one interface configuration may use the more desired naming convention of FIG. 3, etc.).

Accordingly, the network device (e.g., device 10 in FIG. 1) described herein may be configured with one or more mechanisms based on which interfaces may be more flexibly generated (e.g., interfaces having interface identifiers that are flexibly assigned (named) in a manner independent of the physical lane(s) on which the interfaces are implemented are generated).

In some configurations described herein as an illustrative example, network device 10 may obtain one or more port profiles and/or one or more (physical layer interface) module profiles to mitigate these issues and provide flexible interface identifiers, and to do so in a scalable manner. The use of port profiles and/or module profiles as described herein is merely illustrative. As further illustrated herein, network device 10 may generally configure interfaces with flexible interface identifiers with or without the use of port profiles and/or module profiles.

Figure 5:
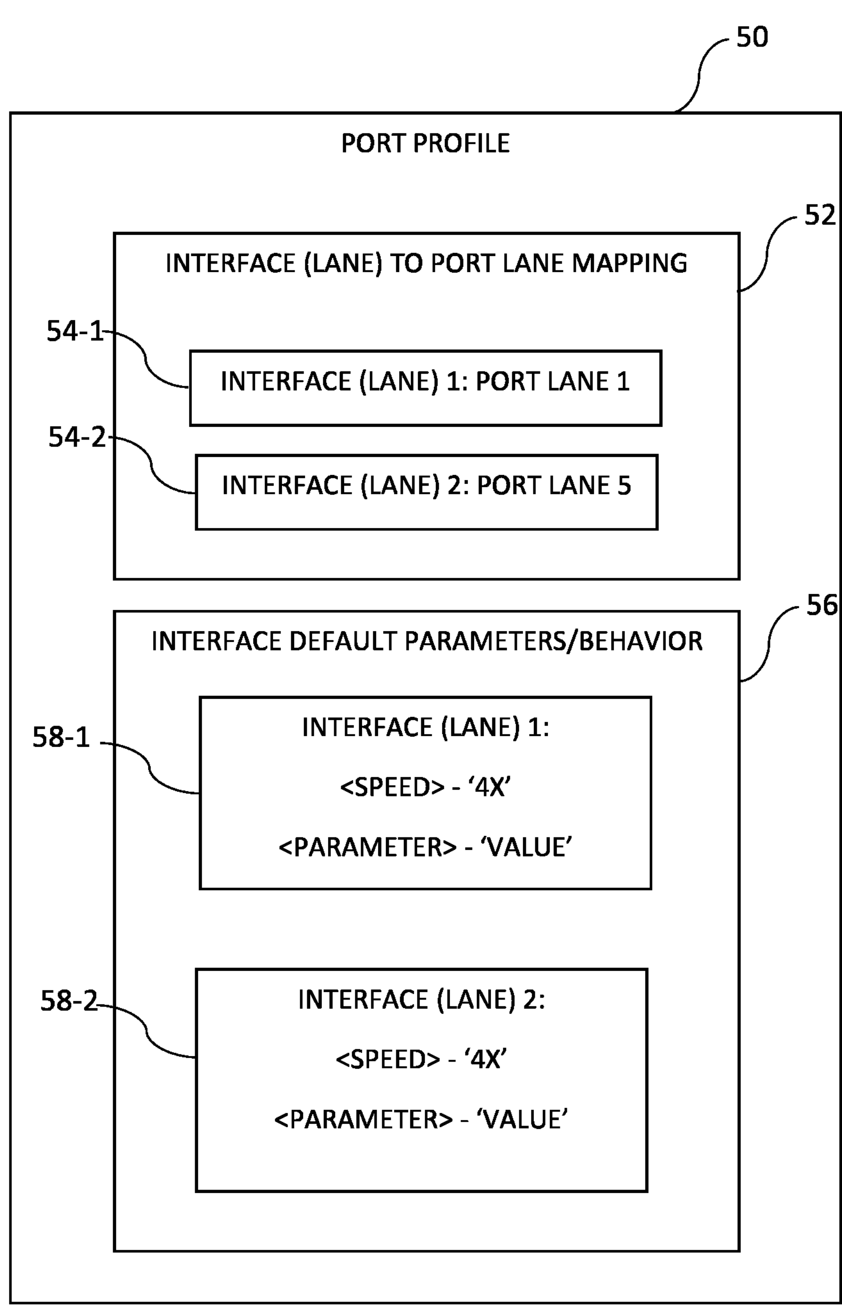
FIG. 5 is a diagram of an illustrative port profile associating each interface with one or more corresponding port lanes in accordance with some embodiments.

FIG. 5 is a diagram of an illustrative port profile 50 that may be stored on network device 10 (e.g., on memory circuitry 20 such as a portion of memory circuitry 20 accessible by processing circuitry 14 when generating, configuring, and/or generally referencing one or more ports 28 and/or interfaces 30 implemented thereon in network device 10).

As shown in FIG. 5, port profile 50 may include information 52 identifying and/or indicative of an interface-to-port-lane mapping (sometimes referred to as an interface-lane-to-port-lane mapping or simply an interface-to-port mapping). Whereas each port lane refers to each physical signaling lane 29 on the corresponding port 28 (FIG. 1), each interface lane refers to a logical (conceptual) lane that provides signaling for each interface 30 and is implemented over the one or more corresponding underlying physical signaling lanes 29 on the port 28. The number of underlying physical signal lanes operating collectively as the interface lane may vary depending on the needs of the interface (e.g., may vary dynamically during operation of the interface depending on the bandwidth, may be fixed after configuration but vary as the interface is reconfigured, etc.).

As an example, port profile 50 of FIG. 5 may be applicable to the interface configuration described in connection with FIGS. 3 and 4B. In particular, interface-to-port mapping (information) 52 contains first interface mapping information 54-1 and second interface mapping information 54-2. Information 54-1 may identify a first interface 1 (e.g., an interface having interface identifier . . . /1 or 1/1/1 implemented over port lanes 1-4 in FIG. 3) and associate port lane 1 with this first interface 1. Port lane 1 may be a leading physical port lane on which interface 1 is implemented and/or with which additional physical port lanes operate to implement interface 1. If desired, information 54-1 may identify these additional port lanes on which interface 1 is configured to be or can be implemented (e.g., reserved for interface 1, for use when needed).

Additionally and perhaps more importantly, instead of referring to a second interface 5 (e.g., an interface having an interface identifier . . . /5 or 1/1/5 in the example of FIG. 3), information 54-2 for interface-to-port mapping 52 may further identify a second interface 2 (e.g., referring to an interface identifiable using interface identifier . . . /2 or 1/1/2 implemented over port lanes 5-8 in FIG. 3) and associate port lane 5 with this second interface 2. Port lane 5 may be a leading physical port lane on which interface 2 is implemented and/or with which additional physical port lanes operate to implement interface 2. If desired, information 54-2 may identify these additional port lanes on which interface 2 is configured to be or can be implemented (e.g., reserved for interface 2, for use when needed).

In other words, the use of port profile 50 to configure port 28 and two interfaces 30 implemented thereon when using the two four-lane interface configuration (FIG. 4B) provides the more desired interface reference or identifier scheme (e.g., referring to interfaces by . . . /1 and . . . /2 instead of by . . . /1 and . . . /5). As an example, device 10, when configuring one or more of its ports 28 (e.g., based on user input) for the two four-lane interface configuration, may reference port profile 50 to generate the two interfaces having interface identifiers . . . /1 and . . . /2.

Port profile 50 in FIG. 5 is provided to illustrate how the use of port profiles 50 provides flexibility to interface referencing (or interface naming) and not necessarily the particular set of interface identifiers shown in and described in connection with FIG. 5. In other words, for the same type of port 28, a first user, network device, and/or networking environment may prefer the use of interfaces 1 and 2 (e.g., referencing these two interfaces by interface identifiers . . . /1 and . . . /2), a second user, network device, and/or networking environment, may prefer the use of interfaces 1 and 3 (e.g., referencing these two interfaces by . . . /1 and . . . /3), and a third user, network device, and/or networking environment may prefer the use of interfaces 7 and 8 (e.g., referencing these two interfaces by . . . /7 and . . . /8). A corresponding port profile for each of these preferred interface referencing schemes (e.g., associating interfaces 1 and 2 to port lanes 1 and 5, respectively, associating interfaces 1 and 3 to port lanes 1 and 5, respectively, and associating interfaces 7 and 8 to port lanes 1 and 5, respectively) may all be stored, if desired, in a port profile library (e.g., port profile library 60 in FIG. 6).

In addition to storing interface-to-port mapping 52, port profile 50 in FIG. 5 may also store interface parameter and/or behavior information 56 that contains default parameters (and/or behaviors) for one or more interfaces (e.g., each interface for which an interface-to-port mapping is identified in information 52). These default parameters may include information identifying, for the one or more interfaces, an interface speed, an interface lane count, an interface pause setting, a FEC (forward error correction) setting, an autoneg (auto-negotiation) setting, a hardware resource allocation (e.g., phase-locked loop settings), and/or other parameters such as other physical layer and/or interface-defining parameters. These default parameters may be defined on a per-interface basis as part of information 56. Instead of or in addition to default parameters defined on a per-interface basis, information 56 may include default parameter and/or behavior defined on a per-port basis (e.g., indicative of a port parameter or port behavior enforced across all interfaces formed by physical lanes of the port or generally enforced at the port-level). In the example of FIG. 5, interface parameter and/or behavior information 56 contains first interface parameter and/or behavior information 58-1 and second interface parameter and/or behavior information 58-2.

In particular, contained as part of information 58-1, interface 1 (e.g., the interface mapping to port lane 1 as indicated in information 54-1) may be associated with a default interface speed value of 4× (e.g., as described in connection with FIG. 3) and other parameter values for interface 1. Contained as part of information 58-2, interface 2 (e.g., the interface mapping to port lane 5 as indicated in information 54-2) may be associated with a default interface speed value of 4× (e.g., as described in connection with FIG. 3) and other parameter values for interface 2. While parameter-value pairs are illustrated, if desired, more complex interface-specific behavior may be also defined in port profile 50.

If desired, port profile 50 may define a reduced set of capabilities relative to an available set of capabilities supported by physical port hardware and/or supported by one or more protocol(s) and/or may define (e.g., expose) a newly available set of capabilities that were previously unavailable because of software (feature) limitations. As an example, port profile 50 may restrict available speeds to only a particular speed (e.g., a speed of 4×, thereby removing any option for X or 2× speeds, referring to the description in connection with FIG. 3) or may enable a speed that is originally not supported (e.g., a speed of 8×).

Ports 28 of module(s) 26 in device(s) 10 (FIG. 1) may include a number of ports of different types (e.g., based on different technologies such as ports containing different numbers of physical lanes, containing physical lanes having different lane speeds, and/or having different form-factors or cages, based on different functions such as management ports, uplink ports, downlink ports, and/or based on other differences depending on the module and/or device containing the ports). Each port 28 of the same type may have the same and/or different interface configurations.

To provide flexible interface referencing and generation with the use of port profile(s) as described in connection with FIG. 5, network device 10 may include a port profile library containing numerous port profiles 50 each containing an interface-to-port mapping and corresponding interface default parameters such as those described in connection with FIG. 5. Each port 28 (e.g., each type of port) may be configurable by one or more of these port profiles for that port type. In particular, depending on the desired interface configuration for that port 28, a corresponding port profile may be selected from the port profile library (e.g., from the port profiles for that port type) to identify and generate the interface(s) (e.g., containing the desired interface identifier(s) and parameter(s)) formed on the single port 28. In other words, port profiles 50 may be port-type-specific but may also further be interface-configuration-specific for that port type.

Figure 6:
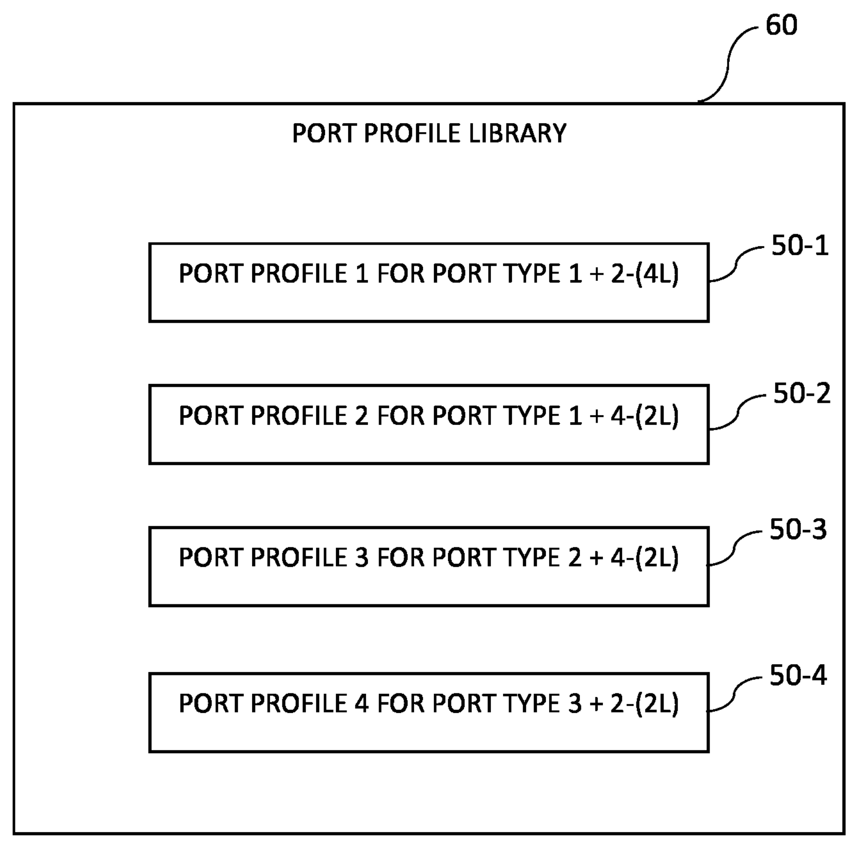
FIG. 6 is a diagram of an illustrative port profile library containing one or more port profiles in accordance with some embodiments.

FIG. 6 shows an illustrative port profile library 60 containing four illustrative port profiles 50-1, 50-2, 50-3, and 50-4 (sometimes referred to herein collectively as port profiles 50). A port profile library such as port profile library 60 in FIG. 6 may be stored on network device 10 (e.g., on memory circuitry 20 such as a portion of memory circuitry 20 accessible by processing circuitry 14 when generating, configuring, and/or generally referencing one or more ports 28 and/or interfaces 30 implemented thereon in network device 10).

In the example of FIG. 6, port profile library 60 contains a first port profile (referred to herein as port profile 1 or port profile 50-1) usable for any port of port type 1 when a two four-lane interface configuration is desired, a second port profile (referred to herein as port profile 2 or port profile 50-2) usable for any port of the same port type 1 but when a four two-lane interface configuration is desired, a third port profile (referred to herein as port profile 3 or port profile 50-3) usable for any port of port type 2 (different from port type 1) when a four two-lane interface configuration is desired, and a fourth port profile (referred to herein as port profile 4 or port profile 50-4) usable for any port of port type 3 (different than port type 1 and port type 2) when a two two-lane interface configuration is desired. Each of these port profiles may be different interface-to-port mapping 52 and/or different interface parameter and behavior information 56 relative to each other.

While port profiles such as port profiles 50 described in connection with FIGS. 5 and 6 allow for flexibility when generating (e.g., referencing or identifying) interfaces for different interface configurations on the same or different ports, it may still be tedious for a user to provide input for each port indicating which port profile to apply to that port. This issue may be worsened if periodic network device reconfigurations are needed as the user would then need to provide per-port input not only during the initial provisioning process of one or more network devices but also periodically thereafter for the one or more of network devices.

To help facilitate configuration for ports (e.g., identification and configuration of the interfaces thereon), one or more (physical layer interface) module profiles may be provided for network device(s) 10. With module profiles, configuration of ports (e.g., identification and configuration of the interfaces thereon) may occur at the per-module level (e.g., across multiple ports or even all ports on a same module 26 in parallel) instead of at the per-port level (e.g., instead of at each port 28 in a sequential manner). In other words, a network device 10 may configure ports of an entire module 26 to form a set of desired interface(s) by applying a desired module profile to that module 26 and reconfigure the port of the entire module 26 to form another set of desired interface(s) by applying a different module profile to the same module 26.

Figure 7:
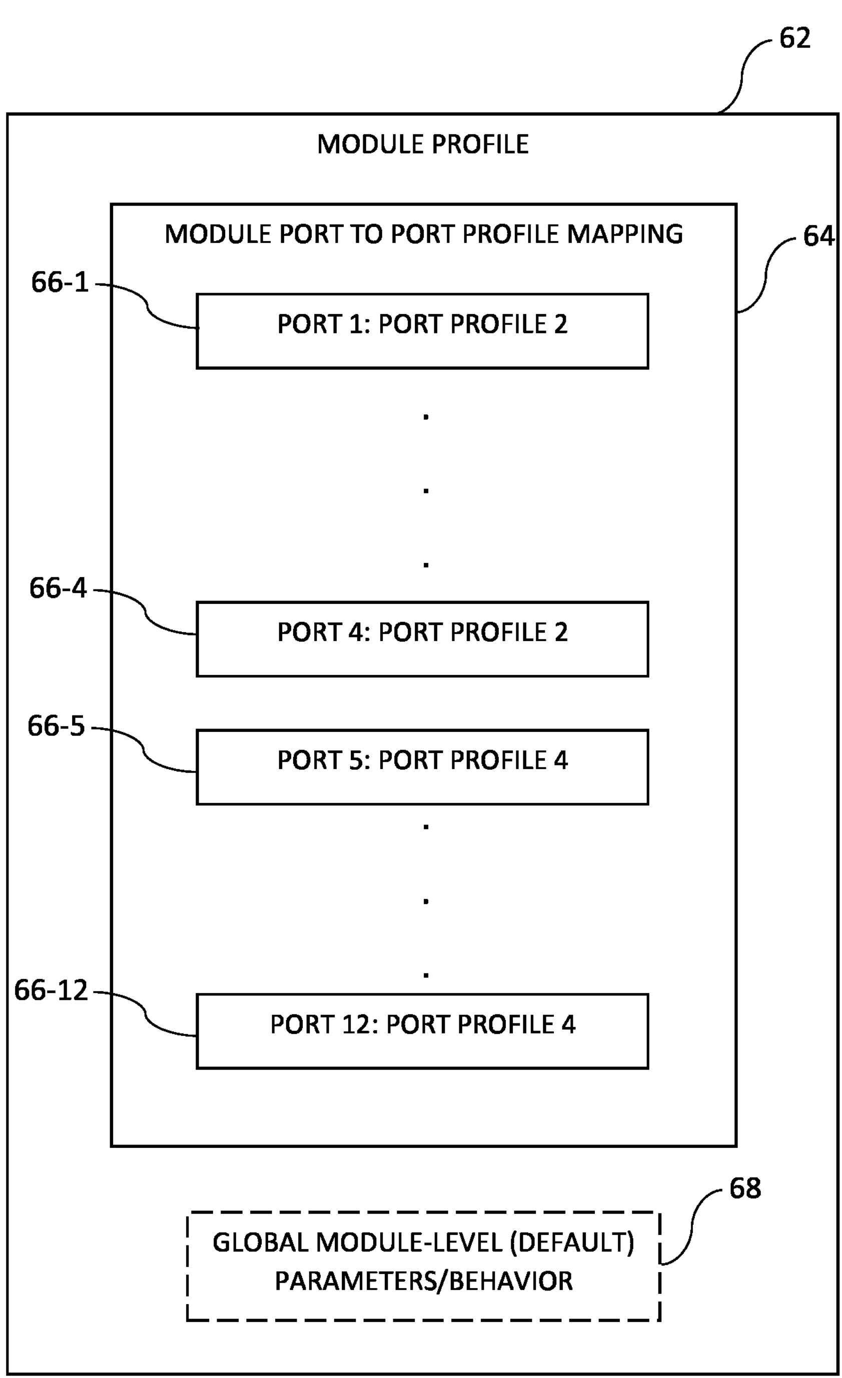
FIG. 7 is a diagram of an illustrative module profile associating each port with one or more corresponding port profiles in accordance with some embodiments.

FIG. 7 is a diagram of an illustrative module profile 62 that may be stored on network device 10 (e.g., on memory circuitry 20 such as a portion of memory circuitry 20 accessible by processing circuitry 14 when generating, configuring, and/or generally referencing one or more modules 26 each having one or more ports 28, and more specifically corresponding interfaces 30 implemented thereon, in network device 10).

As shown in FIG. 7, module profile 62 may include information 64 containing, identifying, and/or indicating a (module) port-to-port-profile mapping. As an example, the illustrative module profile 62 of FIG. 7 may identify twelve ports 28 (e.g., of a module 26) to which port profiles are matched. In particular, a first set of mapping information 66-1, 66-2, 66-3, and 66-4 may associate four of the twelve ports 28 (PORT 1, PORT 2, PORT 3, and PORT 4) with the same port profile 2 (port profile 50-2 in FIG. 6). A second set of mapping information 66-5, 66-6, . . . , and 66-12 may associate the remaining eight of the twelve ports 28 (PORT 5, PORT 6, . . . , PORT 12) with the same port profile 4 (port profile 50-4 in FIG. 6).

The illustrative module profile 62 in FIG. 7 is provided to illustrate how the use of module profiles facilitates flexible and efficient port configuration (e.g., interface referencing or interface naming simultaneously for multiple ports) and not necessarily the particular set of port profiles 50 shown in and described in connection with FIG. 7. In other words, for the same type of physical layer interface module 26, a first user, network device, and/or networking environment may prefer the use of a first set of port profiles for the twelve ports of module 26, a second user, network device, and/or networking environment may prefer the use of a second set of port profiles for the twelve ports of module 26, and a third user, network device, and/or networking environment may prefer the use of a third set of port profiles for the twelve ports of module 26. A corresponding module profile for each of these preferred module configuration schemes (e.g., associating the twelve module ports with the first set of port profiles, associating the twelve module ports with the second set of port profiles, and associating the twelve module ports with the third set of port profiles) may all be stored, if desired, in a module profile library (e.g., module profile library 70 in FIG. 8).

If desired, in addition to containing and storing information 64 identifying a port-to-port-profile mapping, module profile 62 may also contain and store default parameters for one or more of these ports (e.g., one or more of the ports mapped to corresponding port profile(s) in information 64) as information 68. These default parameters may include information identifying per-port parameters (and behavior) and/or multi-port or global module-level parameters (and behavior). As examples, information 68 may indicate a maximum number of logic ports available on a module 26 (e.g., restrict the number of logical ports available on a module 26), may specify module-level behavior with respect resources such as one or more portions of packet processors 22 in FIG. 1 shared across multiple ports, etc.

Device(s) 10 (FIG. 1) may each include a number of physical layer interface modules 26 of different types (e.g., based on different module technologies, based on different port configurations each having a different number of ports of different port types and/or having different port form-factors, based on different module functions, and/or based on other differences depending on the network device containing the module(s), depending on the different geographical locations of network device deployments, depending on different types of network applications, etc.). Each module 26 of the same type may have the same and/or different interface configurations across its ports 28.

To provide flexible and efficient interface referencing and generation across multiple ports of the same or different modules using module profile(s) as described in connection with FIG. 7, network device 10 may include a (physical layer interface) module profile library containing numerous module profiles 62 each containing a module-port-to-port-profile mapping and port default parameters such as those described in connection with FIG. 7. Each module 26 (e.g., each type of module) may be configurable by one or more of these module profiles for that module type. In particular, depending on the desired interface configuration for ports 28 across the module 26, a corresponding module profile may be selected from the module profile library (e.g., from the module profiles for that module type) to identify and generate the interface(s) (e.g., containing the desired interface identifier(s) and parameter(s)) formed on multiple ports 28 across the module 26. In other words, module profiles 62 may be module-type-specific but may also further be port-type specific and interface-configuration-specific for that module type.

Figure 8:
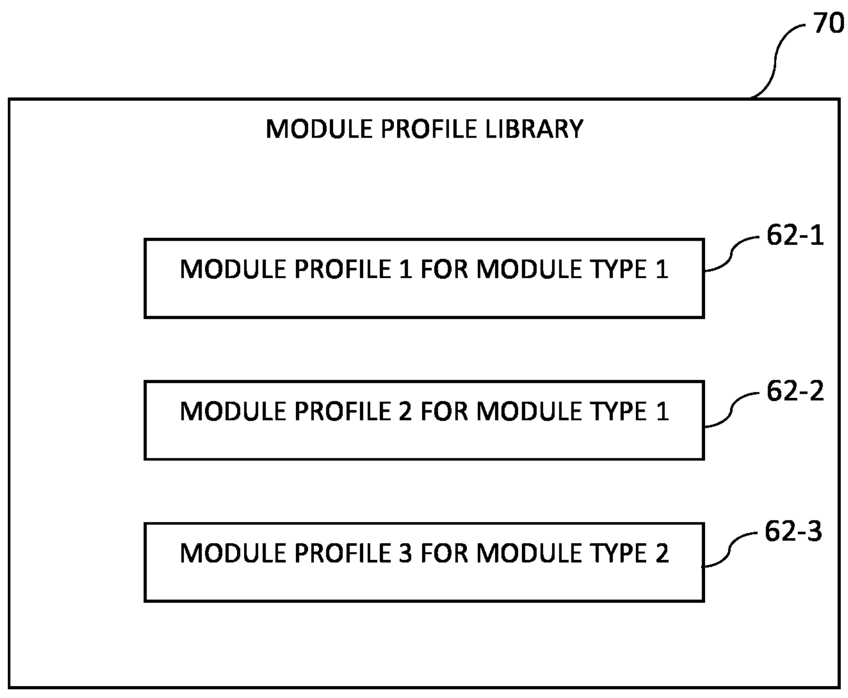
FIG. 8 is a diagram of an illustrative module profile library containing one or more module profiles in accordance with some embodiments.

FIG. 8 shows an illustrative module profile library 70 containing three illustrative module profiles 62-1, 62-2, and 62-3 (sometimes referred to herein collectively as module profiles 62). A module profile library such as module profile library 70 in FIG. 6 may be stored on network device 10 (e.g., on memory circuitry 20 such as a portion of memory circuitry 20 accessible by processing circuitry 14 when generating, configuring, and/or generally referencing one or more modules 26 each having one or more ports 28, and more specifically corresponding interfaces 30 implemented thereon, in network device 10).

In the example of FIG. 8, module profile library 70 contains a first module profile (referred to herein as module profile 1 or module profile 72-1) usable for any module 26 of a first module type (MODULE TYPE 1), a second module profile (referred to herein as module profile 2 or module profile 72-2) usable for any module 26 of the same first module type (MODULE TYPE 1), and a third module profile (referred to herein as module profile 3 or module profile 72-3) usable for a second module type (MODULE TYPE 2) that is different from the first module type.

Network device 10 (FIG. 1) may obtain, store, and/or use different port profile libraries and different module profile libraries. Configurations in which network device 10 is configured to store and access one or more default port profile libraries and one or more default module profile libraries that is shared (common) across and generally accessible to (e.g., stored at) multiple network devices 10 (e.g., multiple instances of network device 10 in FIG. 1) are sometimes described herein as an example. In addition to these default libraries, these multiple network devices 10 may each include their own custom port profile and/or module profile libraries, at least some of which differ across these multiple network devices.

Figure 9:
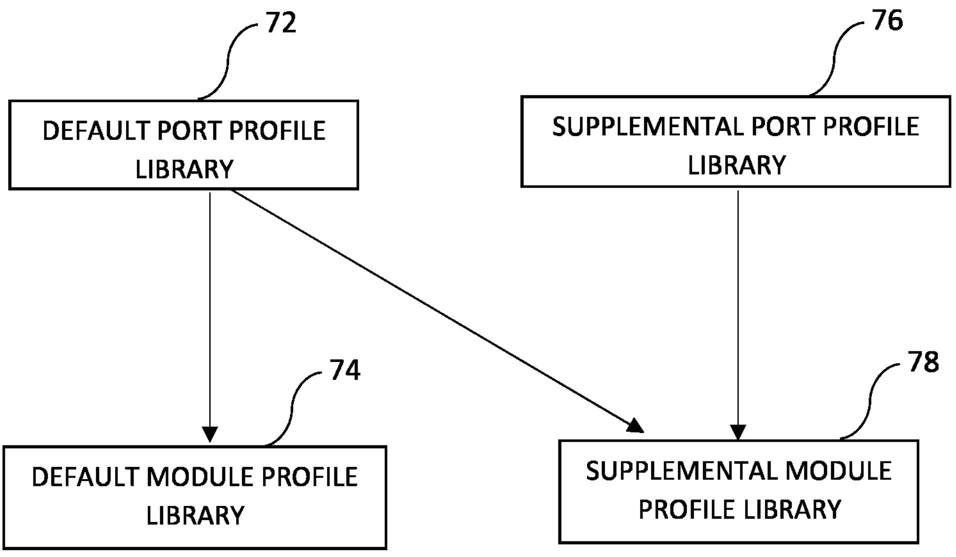
FIG. 9 is a diagram of illustrative types of port profile libraries and module profile libraries in accordance with some embodiments.

As shown in the illustrative example of FIG. 9, network device 10 may be provisioned with (e.g., via zero-touch provisioning or minimal-touch provisioning, or via a user-provisioning operation) or may be pre-installed with a default port profile library 72 (e.g., a built-in port profile library) and a default module profile library 74 (e.g., a built-in module profile library). Module profile(s) 62 in default module profile library 74 may each reference port profiles 50 in default port profile library 72 in its port-to-port-profile mapping information 64 (FIG. 7).

Furthermore, if desired, network device 10 may receive information (e.g., based on user input) specifying parameters (e.g., mapping information 52 and interface parameters and/or behavior information 56 described in connection with FIG. 5) useable to construct (e.g., define and generate) one or more additional port profiles contained in a supplemental port profile library 76 (sometimes referred to as a user-defined port profile library). Network device 10 may further receive information (e.g., based on user input) specifying parameters (e.g., mapping information 64 and port or global parameters and/or behavior information 68 described in connection with FIG. 7) usable to construct (e.g., define and generate) one or more additional module profiles contained in a supplemental module profile library 78 (sometimes referred to as a user-defined module profile library). The received mapping-specifying and parameter-specifying information (for constructing the one or more additional module profiles) and therefore the constructed one or more additional module profiles may reference port profiles 50 in default port profile library 72 and/or additional port profiles in supplemental port profile library 76. One or more of these different libraries may be stored on separate portions (e.g., data structures) on memory 20 and/or may be stored one or more shared data structures on memory 20.

While in the example of FIG. 9 default port profile library 72 is shown as a library separate from supplemental port profile library 76, this is merely illustrative. If desired, a single port profile library may be used to store both the built-in port profile(s) and the later-added user-defined port profile(s). While in the example of FIG. 9 default module profile library 74 is shown as a library separate from supplemental module profile library 78, this is merely illustrative. If desired, a single module profile library may be used to store both the built-in module profile(s) and the later-added user-defined module profile(s). If desired, one or more of these libraries and the profiles therein may be omitted (e.g., supplemental port profiles and library 76 may be omitted).

In other illustrative arrangements described herein as another example, the use of libraries for storing port and/or module profiles as described in connection with FIGS. 5-9 may be omitted. Instead of storing these port and/or module profiles, network device 10 may be configured to receive information indicative of desired interface configurations on a per port basis (e.g., may receive user input indicating mapping information 52 in FIG. 5 and/or indicating interface default parameter information 56 in FIG. 5) and/or on a per module basis (e.g., may receive user input indicating mapping information 64 in FIG. 7 and/or indicating global module-level default parameter information 68 in FIG. 7 and may receive user input indicating mapping information 52 in FIG. 5 and/or indicating interface default parameter information 56 in FIG. 5 to define mapping information 64 in FIG. 7). In such a manner, network device 10 may be configured to provide a mechanism for flexible interface generation directly via user input instead of (or, if desired, in addition to) using stored port and/or module profile libraries as described in connection with FIGS. 5-9.

Figure 10:
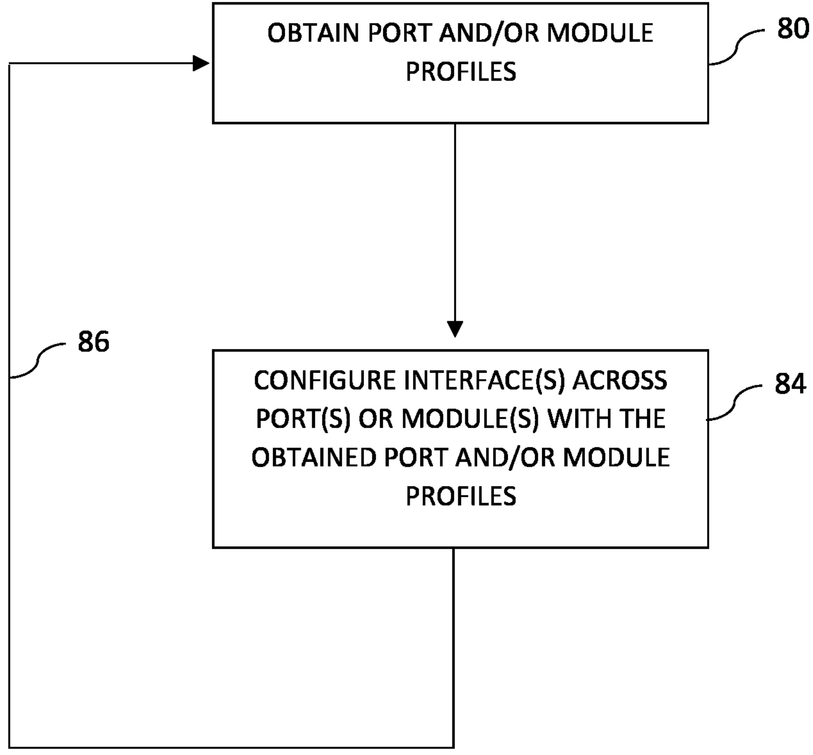
FIG. 10 is a flowchart of illustrative operations for using profiles to configure interfaces across one or more ports and/or modules in accordance with some embodiments.

FIG. 10 is a flowchart of illustrative operations for configuring interfaces of a network device 10. These operations may be performed at control plane control circuitry 12 in network device 10 (FIG. 1) and/or data plane packet processor(s) 22 in network device 10 (FIG. 1). The illustrative operations described in connection with FIG. 10 performed by one or more processors (e.g., processing circuitry and/or packet processors) in network device 10 may be performed by executing software instructions stored on corresponding memory circuitry 20 (e.g., one or more non-transitory computer-readable media). If desired, one or more operations described in connection with FIG. 10 may be performed by other dedicated hardware components in network device 10. Configurations in which the operations described in connection with FIG. 10 are performed by processing circuitry 14 on device 10 are sometimes described herein as an illustrative example.

In particular, at block 80, processing circuitry 14 on device 10 may obtain one or more port profiles and/or one or more module profiles (e.g., in one or more of libraries 72, 74, 76, and 78 described in connection with FIG. 9). As examples, processing circuitry 14 obtaining a (port or module) profile may include processing circuitry 14 accessing memory circuitry 20 to retrieve one or more built-in or default profiles (e.g., retrieve a module profile 62 in default module profile library 74 and accessing one or more port profiles 50 referenced by the module profile 62), may include processing circuitry 14 generating a newly defined (port or module) profile based on user input, and if necessary, accessing memory circuitry 20 for port profiles referred to by the newly defined (module) profile, and/or may include processing circuitry 14 accessing memory circuitry 20 to retrieve one or more user-defined profiles (e.g., retrieve a module profile in supplemental module profile library 78 and accessing one or more port profiles referenced by the module profile).

In general, as part of block 80, processing circuitry 14 may obtain information indicative of desired interface configurations on a per port basis (e.g., may receive user input indicating mapping information 52 in FIG. 5 and/or indicating interface default parameter information 56 in FIG. 5) and/or on a per module basis (e.g., may receive user input indicating mapping information 64 in FIG. 7 and/or indicating global module-level default parameter information 68 in FIG. 7 and may receive user input indicating mapping information 52 in FIG. 5 and/or indicating interface default parameter information 56 in FIG. 5 to define mapping information 64 in FIG. 7) with or without obtaining profiles from libraries. In other words, in some embodiments, libraries containing port and module profiles may be omitted and processing circuitry 14 may obtain the necessary interface configuration information (that otherwise would be presented in these port and module profiles) directly based on user input (e.g., commands, scripts, and/or configuration files containing the above-mentioned interface configuration information received via a command line interface, an application programming interface, and/or other user interface circuitry configured to receive user input, directly or indirectly, and provide the user input to processing circuitry 14).

Based on one or more inputs indicative of port and/or module profile information (e.g., received user input, received interface configuration file(s), received port and/or module profiles, etc.), processing circuitry 14 may use the obtained profiles referenced by the inputs to configure, and thereby generate, corresponding interfaces (at block 84). As a first example, based on receiving input indicative of a port and an associated port profile, processing circuitry 14 may configure interfaces of the port based on the port profile. As a second example, based on receiving input indicative of a physical layer interface module and a module profile, processing circuitry 14 may configure interfaces of multiple ports across the module based on the module profile. As a third example, processing circuitry 14 may configure interfaces of the port based on user input containing desired interface configurations on a per port basis and/or on a per module basis. If desired, a combination of these examples may be used to configure the same or different interfaces across the port and/or module.

If desired, based on one or more criteria being met (e.g., after rebooting network device 10, after power cycling a particular module 26, after receiving corresponding user input, etc.), processing circuitry 14 may obtain additional profiles (e.g., update existing profiles) and/or reconfigure interfaces based on the new set of profiles as indicated by path 86. Accordingly, processing circuitry 14 may periodically perform the operations of blocks 80 and/or 84 at suitable times and/or in response to processing circuitry 14 determining that the one or more criteria has been met.

Figure 11A:
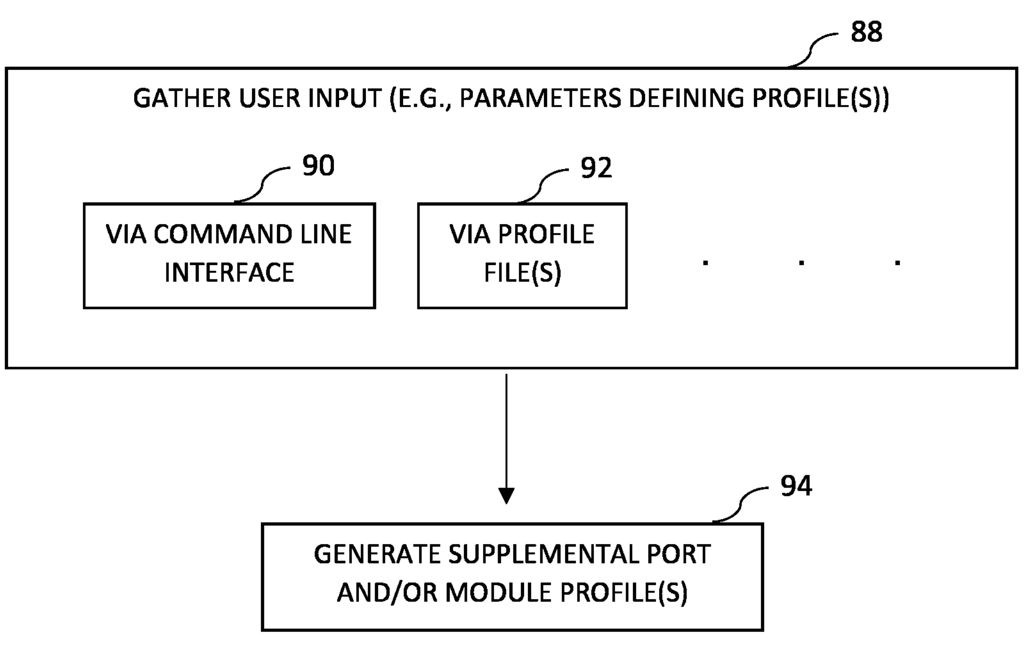
FIGS. 11A and 11B are flowcharts of illustrative operations for facilitating the configuration of interfaces based on user input in accordance with some embodiments.

FIG. 11A is a flowchart of illustrative operations for generating supplemental profiles. These operations may be performed at control plane control circuitry 12 in network device 10 (FIG. 1) and/or data plane packet processor(s) 22 in network device 10 (FIG. 1). The illustrative operations described in connection with FIG. 11A performed by one or more processors (e.g., processing circuitry and/or packet processors) in network device 10 may be performed by executing software instructions stored on corresponding memory circuitry 20 (e.g., one or more non-transitory computer-readable media). If desired, one or more operations described in connection with FIG. 11A may be performed by other dedicated hardware components in network device 10. Configurations in which the operations described in connection with FIG. 11A are performed by processing circuitry 14 on device 10 are sometimes described herein as an illustrative example.

In particular, at block 88, processing circuitry 14 may receive user input (e.g., parameters or generally information usable to define port and/or module profiles). As examples, processing circuitry 14 may receive, at block 90, user input via a command line interface at block 90 (e.g., may prompt input from the user useable to generate a port or module profile), may receive, at block 92, user input in the form one or more port and/or module profile files (e.g., JSON files) readable by processing circuitry 14, and/or may receive input from a user via other mechanisms (e.g., an application programming interface that communicates with external equipment configured to receive the user input). Based on the user input, processing circuitry 14 may generate, at block 94, one or more corresponding supplemental port and/or module profile(s) for storage at supplemental profile libraries 76 and 78 (FIG. 9). If desired, the received interface-defining information (e.g., interface mapping information, interface parameter information, interface behavior information, etc.) for these supplemental port and/or module profiles may be directly applied to ports and/or modules without being stored in supplemental profile libraries 76 and 78.

Figure 11B:
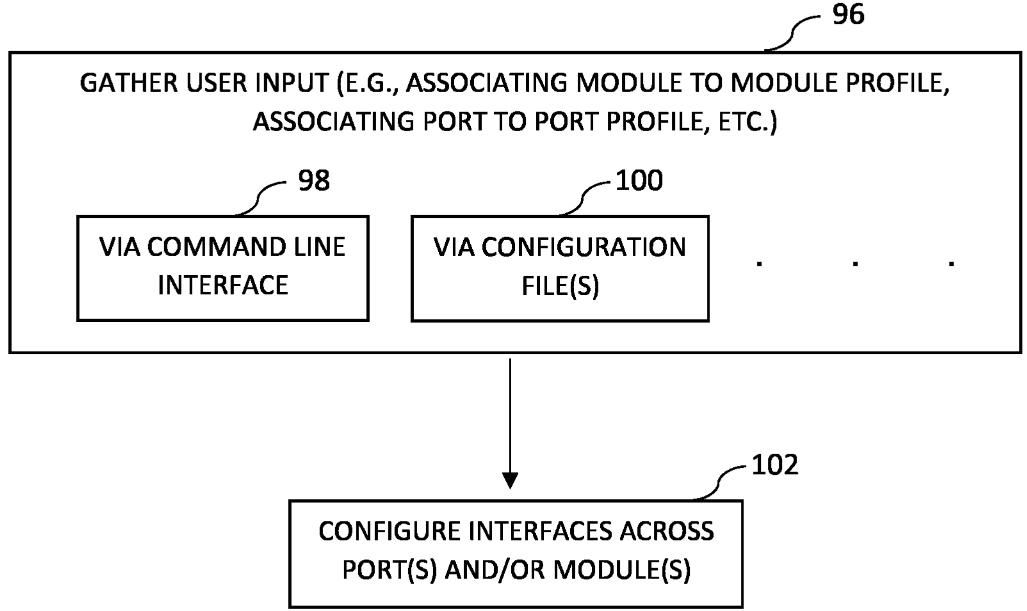

FIG. 11B is a flowchart of illustrative operations for configuring interfaces based on user input. These operations may be performed at control plane control circuitry 12 in network device 10 (FIG. 1) and/or data plane packet processor(s) 22 in network device 10 (FIG. 1). The illustrative operations described in connection with FIG. 11B performed by one or more processors (e.g., processing circuitry and/or packet processors) in network device 10 may be performed by executing software instructions stored on corresponding memory circuitry 20 (e.g., one or more non-transitory computer-readable media). If desired, one or more operations described in connection with FIG. 11B may be performed by other dedicated hardware components in network device 10. Configurations in which the operations described in connection with FIG. 11B are performed by processing circuitry 14 on device 10 are sometimes described herein as an illustrative example.

In particular, at block 96, processing circuitry 14 may receive user input for configuring interfaces on one or more ports (e.g., associating one or more modules 26 to one or more module profiles, associating one or more modules 26 to interface mapping information 52 and/or 46, associating one or more ports 28 to one or more port profiles, associating one or more ports 28 to interface mapping information 46). As examples, processing circuitry 14 may receive, at block 98, user input via a command line interface (e.g., may prompt input from the user to specify one or more ports 26, one or more modules 28, one or more port profiles or generally interface-defining information on a per port basis, one or more module profiles or generally interface-defining information on a per module basis, etc.), may receive, at block 100, user input in the form one or more interface configuration files readable by processing circuitry 14, and/or may receive input from a user via other mechanisms (e.g., an application programming interface that communicates with external equipment configured to receive the user input). Based on the user input, processing circuitry 14 may configure, at block 102, interfaces for one or more ports and/or for one or more modules (e.g., to have the desired interface identifiers, to exhibit the desired interface parameters and behavior, to flexibly generate interfaces that customizable for the user, network device, and/or networking application).

These configured interfaces may subsequently be used to communicate between internal components of device 10 if implemented on internal ports and/or may be used for communication with equipment external to device 10 (e.g., with a management device or server for device 10 for the control plane of device 10, with packet processors in other devices 10 for the data plane of device 10, etc.).

Figure 12:
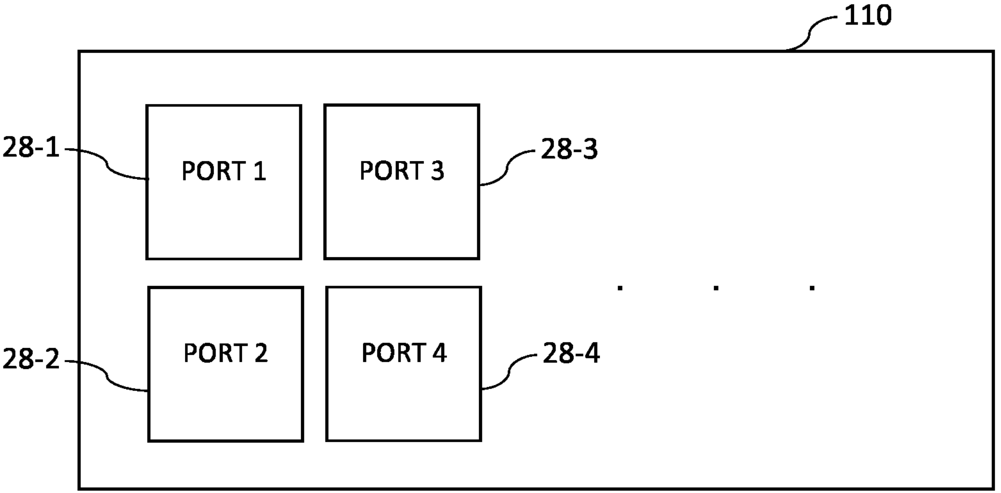
FIG. 12 is a diagram of an illustrative network device having four physical ports in accordance with some embodiments.

FIG. 12 is a diagram of an illustrative system 110 (e.g., a physical layer interface module such as module 26, a line card containing the physical layer interface module, a network device such as network device 10 containing the physical layer interface module, etc.) having four physical ports 28-1, 28-2, 28-3, and 28-4 each containing a plurality of physical port lanes. The four physical ports 28-1, 28-2, 28-3, and 28-4 may each be configurable to implement different sets of interface configurations. Configurations in which system 110 is or is part of device 10 in FIG. 1 are sometimes described herein as an illustrative example.

Figure 13A:
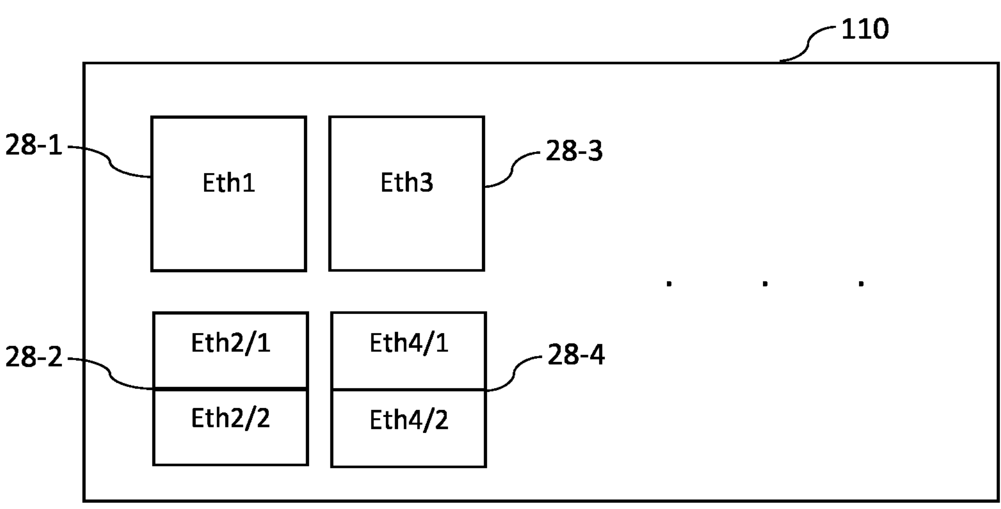
FIGS. 13A and 13B are illustrative diagrams of two different interface configurations based on the same underlying physical ports such as the four physical ports of FIG. 12 in accordance with some embodiments.
Figure 13B:
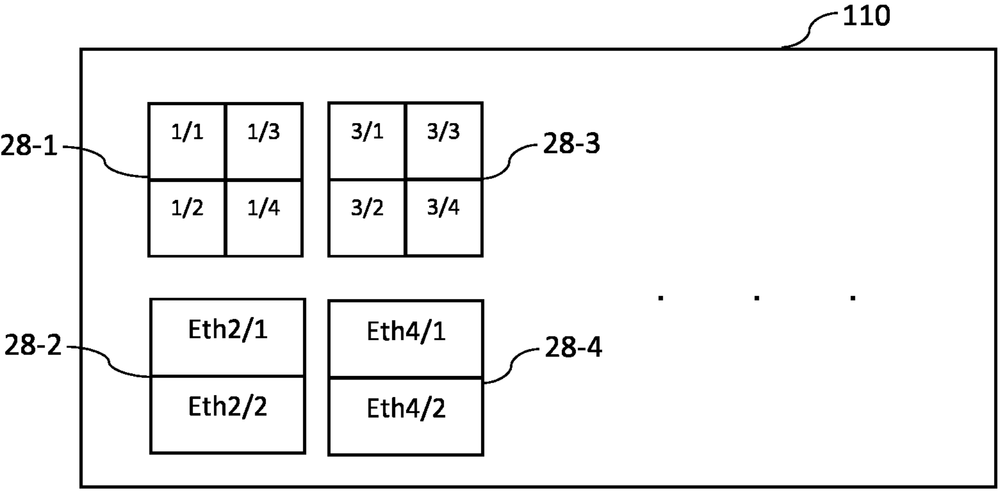

Two illustrative sets of interface configurations for physical ports 28-1, 28-2, 28-3, and 28-4 are shown in FIGS. 13A and 13B, as examples. Configurations in which ports 28-1, 28-2, 28-3, and 28-4 are Ethernet ports that form Ethernet interfaces are described in connection with FIGS. 13A and 13B as illustrative examples. If desired, these illustrative examples described in connection with FIGS. 13A and 13B may be applicable to other types of ports and/or interfaces.

In the example of FIG. 13A, Ethernet port 28-1 may be implemented as a single Ethernet interface having interface identifier Eth1/1 (indicating an Ethernet-type interface implemented at port 28-1 and identifiable as interface 1 of the port) or simply Eth1 (indicating the sole Ethernet-type interface implemented at port 28-1) since there is only a single interface on the port (e.g., using all of the physical port lanes of port 28-1, or if desired, only some of the physical port lanes). Ethernet port 28-2 may be implemented as two Ethernet interfaces respectively having interface identifiers Eth2/1 (indicating an Ethernet-type interface implemented at port 28-2 and identifiable as interface 1 of the port) and Eth2/2 (indicating an Ethernet-type interface implemented at port 28-2 and identifiable as interface 2 of the port). These two Ethernet interfaces at port 28-2 may collectively use all of the physical port lanes of port 28-2, or if desired, only some of the physical port lanes. Ethernet port 28-3 may be implemented as a single Ethernet interface having interface identifier Eth3/1 (indicating an Ethernet-type interface implemented at port 28-3 and identifiable as interface 1 of the port) or simply Eth3 (indicating the sole Ethernet-type interface implemented at port 28-3) since there is only a single interface on the port (e.g., using all of the physical port lanes of port 28-3, or if desired, only some of the physical port lanes). Ethernet port 28-4 may be implemented as two Ethernet interfaces respective having interface identifiers Eth4/1 (indicating an Ethernet-type interface implemented at port 28-4 and identifiable as interface 1 of the port) and Eth4/2 (indicating an Ethernet-type interface implemented at port 28-4 and identifiable as interface 2 of the port). These two Ethernet interfaces at port 28-4 may collectively use all of the physical port lanes of port 28-4, or if desired, only some of the physical port lanes.

Processing circuitry 14 may generate these interfaces at ports 28-1, 28-2, 28-3, and 28-4 (in the example of FIG. 13A) with the desired interface identifiers and/or the desired interface parameters using a first module profile compatible with the type of module in system 110 (e.g., the first module profile may specify port profiles or other interface-mapping information usable with Ethernet ports 28-1, 28-2, 28-3, and 28-4. If desired, processing circuitry 14 may generate these interfaces at ports 28-1, 28-2, 28-3, and 28-4 with the desired interface identifiers and/or the desired interface parameters using one or more individual port profiles without a module profile. If desired, processing circuitry 14 may generate these interfaces at ports 28-1, 28-2, 28-3, and 28-4 with the desired interface identifiers and/or the desired interface parameters based on user input containing interface-to-lane mapping information and interface parameter information for each of these ports 28-1, 28-2, 28-3, and 28-4.

In the example of FIG. 13B, Ethernet port 28-1 may be implemented as four Ethernet interfaces respectively having interface identifiers Eth1/1, Eth1/2, Eth1/3, and Eth1/4 (or simply 1/1, 1/2, 1/3, and 1/4 as shown in FIG. 13B). Interface identifier Eth1/1 indicates an Ethernet-type interface implemented at port 28-1 and identifiable as interface 1 of the port, interface identifier Eth1/2 indicates an Ethernet-type interface implemented at port 28-1 and identifiable as interface 2 of the port, interface identifier Eth1/3 indicates an Ethernet-type interface implemented at port 28-1 and identifiable as interface 3 of the port, and interface identifier Eth1/4 indicates an Ethernet-type interface implemented at port 28-1 and identifiable as interface 4 of the port. These four Ethernet interfaces may collectively use all of the physical port lanes of port 28-1, or if desired, only some of the physical port lanes.

Ethernet port 28-2 may be implemented as two Ethernet interfaces respectively having interface identifiers Eth2/1 (indicating an Ethernet-type interface implemented at port 28-2 and identifiable as interface 1 of the port) and Eth2/2 (indicating an Ethernet-type interface implemented at port 28-2 and identifiable as interface 2 of the port). These two Ethernet interfaces may collectively use all of the physical lanes of port 28-2, or if desired, only some of the physical port lanes.

Ethernet port 28-3 may be implemented as four Ethernet interfaces respectively having interface identifiers Eth3/1, Eth3/2, Eth3/3, and Eth3/4 (or simply 3/1, 3/2, 3/3, and 3/4 as shown in FIG. 13B). Interface identifier Eth3/1 indicates an Ethernet-type interface implemented at port 28-3 and identifiable as interface 1 of the port, interface identifier Eth3/2 indicates an Ethernet-type interface implemented at port 28-3 and identifiable as interface 2 of the port, interface identifier Eth3/3 indicates an Ethernet-type interface implemented at port 28-3 and identifiable as interface 3 of the port, and interface identifier Eth3/4 indicates an Ethernet-type interface implemented at port 28-3 and identifiable as interface 4 of the port. These four Ethernet interfaces may collectively use all of the physical port lanes of port 28-1, or if desired, only some of the physical port lanes.

Ethernet port 28-4 may be implemented as two Ethernet interfaces respectively having interface identifiers Eth4/1 (indicating an Ethernet-type interface implemented at port 28-4 and identifiable as interface 1 of the port) and Eth4/2 (indicating an Ethernet-type interface implemented at port 28-4 and identifiable as interface 2 of the port). These two Ethernet interfaces may collectively use all of the physical port lanes of port 28-4, or if desired, only some of the physical port lanes.

Processing circuitry 14 may generate these interfaces at ports 28-1, 28-2, 28-3, and 28-4 (in the example of FIG. 13B) with the desired interface identifiers and/or the desired interface parameters using a second module profile compatible with the type of module in system 110 (e.g., the first module profile may specify port profiles or other interface-mapping information usable with Ethernet ports 28-1, 28-2, 28-3, and 28-4. If desired, processing circuitry 14 may generate these interfaces at ports 28-1, 28-2, 28-3, and 28-4 with the desired interface identifiers and/or the desired interface parameters using one or more individual port profiles without a module profile. If desired, processing circuitry 14 may generate these interfaces at ports 28-1, 28-2, 28-3, and 28-4 with the desired interface identifiers and/or the desired interface parameters based on user input containing interface-to-lane mapping information and interface parameter information for each of these ports 28-1, 28-2, 28-3, and 28-4.

The methods and operations described above in connection with FIGS. 1-13 may be performed by the components of one or more network devices and/or server or other host equipment using software, firmware, and/or hardware (e.g., dedicated circuitry or hardware). Software code for performing these operations may be stored on non-transitory computer-readable storage media (e.g., tangible computer-readable storage media) stored on one or more of the components of the network device(s) and/or server or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer-readable storage media may be executed by processing circuitry on one or more of the components of the network device(s) and/or server or other host equipment (e.g., processing circuitry 14 in network device(s) 10, packet processor(s) 22 in network device(s) 10, etc.).

The foregoing is merely illustrative and various modifications can be made to the described embodiments. The foregoing embodiments may be implemented individually or in any combination.

What is claimed is:

1. A network device comprising:

a port of a given port type; and control circuitry configured to:

store a port profile library containing a first port profile for configuring any port of the given port type and that specifies a first interface-to-port-lane mapping for each port configured with the first port profile, and a second port profile for configuring any port of the given port type and that specifies a second interface-to-port-lane mapping for each port configured with the second port profile, wherein the first interface-to-port-lane mapping specified by the first port profile identifies a first interface lane, for each port configured with the first port profile, a first physical lane, of each port configured with the first port profile, on which the first interface lane is to be implemented, a second interface lane, for each port configured with the first port profile, and a second physical lane, of each port configured with the first port profile, on which the second interface lane is to be implemented;

receive input that indicates the first port profile, from the port profile library, for configuring the port; and based on the received input, configure the port by providing, based on the first interface-to-port-lane mapping, the first interface lane for the port using at least the first physical lane of the port and by providing, based on the first interface-to-port-lane mapping, the second interface lane for the port using at least the second physical lane of the port.

2. The network device defined in claim 1, wherein the first physical lane of the port has a first physical lane identifier, wherein the second physical lane of the port has a second physical lane identifier, wherein the first interface lane for the port has a first interface identifier, and wherein the second interface lane for the port has a second interface identifier that is different from the second physical lane identifier.

3. The network device defined in claim 2, wherein the first interface lane provides signaling for a first interface implemented over at least the first physical lane of the port and wherein the second interface lane provides signaling for a second interface implemented over at least the second physical lane of the port.

4. The network device defined in claim 2 further comprising:

a physical layer interface module that includes the port, wherein the first interface identifier includes an identifier for the physical layer interface module and wherein the second interface identifier includes the identifier for the physical layer interface module.

5. The network device defined in claim 1 further comprising:

an additional port of the given port type, wherein the control circuitry is configured to apply the first port profile to the additional port by providing, based on the first interface-to-port-lane mapping, the first interface lane for the additional port using at least the first physical lane of the additional port and by providing, based on the first interface-to-port-lane mapping, the second interface lane for the additional port using at least the second physical lane of the additional port.

6. The network device defined in claim 5 further comprising:

a third port of the given port type, wherein the control circuitry is configured to apply the second port profile to the third port by providing, based on the second interface-to-port-lane mapping, one or more additional interface lanes for the third port.

7. The network device defined in claim 5, wherein the received input indicates the first port profile, from the port profile library, for configuring the additional port.

8. The network device defined in claim 1, wherein the received input specifies a module profile from a module profile library stored by the control circuitry and wherein the module profile identifies the first port profile for configuring the port.

9. The network device defined in claim 1, wherein the port is an external port configured to receive equipment external to the network device or is an internal port configured to connect to a component internal to the network device.

10. A method of operating a network device having a plurality of ports of a given port type each with a plurality of lanes, the method comprising:

storing a port profile library that includes a plurality of port profiles, the plurality of port profiles containing port profiles for the given port type, wherein the port profiles for the given port type each include one corresponding interface-to-port-lane mapping and wherein at least some of the interface-to-port-lane mappings of the port profiles for the given port type comprise different interface-to-port-lane mappings;

receiving, by the network device, input indicative of a same interface-to-port-lane mapping, out of the different interface-to-port-lane mappings, for configuring each port of the plurality of ports, wherein the input specifies a same port profile out of the port profiles for the given port type and specifies each port of the plurality of ports for which interface configuration is performed based on the same port profile; and generating one or more interfaces on each port of the plurality of ports by applying the same port profile to each port of the plurality of ports, wherein each port of the plurality of ports, when applied with the same port profile, implements the same interface-to-port-lane mapping.

11. The method defined in claim 10, wherein the same interface-to-lane mapping identifies a same first interface on each port of the plurality of ports, at least a same first lane of each port of the plurality of ports associated with the corresponding first interface on each port of the plurality of ports, a same second interface on each port of the plurality of ports, and at least a same second lane of each port of the plurality of ports associated with the corresponding second interface on each port of the plurality of ports, and wherein the one or more interfaces generated on each port of the plurality of ports comprise the first and second interfaces on each port of the plurality of ports.

12. The method defined in claim 10 further comprising:

receiving, by the network device, additional input indicative of same interface parameters for configuring each port of the plurality of ports, wherein the one or more interfaces generated on each port of the plurality of ports exhibit the same interface parameters.

13. A network device comprising:

a module that includes first and second ports;

memory circuitry configured to store a library containing a plurality of port profiles and containing a plurality of module profiles, a given module profile of the plurality of module profiles specifies use of a given port profile of the plurality of port profiles for configuring the first port and specifies use of the given port profile for configuring the second port, wherein the given port profile includes one interface-to-port-lane mapping and a plurality of default parameter values for forming one or more interfaces using physical lanes of each port configured using the given port profile; and processing circuitry coupled to the module and the memory circuitry and configured to:

receive user input specifying the module and specifying the given module profile for performing interface configuration for the module, and based on the received user input, apply the given module profile to the module by configuring each of the first and second ports of the module using the given port profile to generate a first set of the one or more interfaces using the physical lanes of the first port and to generate a second set of the one or more interfaces using the physical lanes of the second port, wherein each interface default parameter value of the first set of the one or more interfaces is the same as a corresponding interface default parameter value of the second set of the one or more interfaces.

14. The network device defined in claim 13, wherein the module exhibits a first interface configuration when the given module profile is applied to the module and wherein the module exhibits a second interface configuration when an additional module profile of the plurality of module profiles is applied to the module.

15. The network device defined in claim 13, wherein the first set of the one or more interfaces implements the same one interface-to-port-lane mapping of the given port profile as the second set of the one or more interfaces.

16. The network device defined in claim 13, wherein the plurality of port profiles each include one corresponding interface-to-port-lane mapping.

17. The network device defined in claim 16, wherein the plurality of port profiles each include one corresponding set of default parameter values.

18. The network device defined in claim 13, wherein the plurality of default parameter values comprise an interface speed, an interface lane count, an interface pause setting, a forward error correction setting, an auto-negotiation setting, or a hardware resource allocation.

19. The network device defined in claim 13, wherein the first port is configurable using any one of multiple port profiles of the plurality of port profiles and wherein the multiple port profiles include the given port profile.

20. The network device defined in claim 19, wherein the first port is of a given port type and wherein the multiple port profiles are each specific to the given port type.

* * * * *